United States Patent
Uemura et al.

(10) Patent No.: US 11,884,273 B2
(45) Date of Patent: Jan. 30, 2024

(54) VEHICLE CONTROL DEVICE, VEHICLE CONTROL METHOD, AND VEHICLE CONTROL SYSTEM

(71) Applicant: Hitachi Automotive Systems, Ltd., Hitachinaka (JP)

(72) Inventors: Koichi Uemura, Atsugi (JP); Taku Takahama, Yokohama (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 460 days.

(21) Appl. No.: 17/255,326

(22) PCT Filed: Jul. 3, 2019

(86) PCT No.: PCT/JP2019/026464
§ 371 (c)(1),
(2) Date: Dec. 22, 2020

(87) PCT Pub. No.: WO2020/013050
PCT Pub. Date: Jan. 16, 2020

(65) Prior Publication Data
US 2021/0269030 A1 Sep. 2, 2021

(30) Foreign Application Priority Data
Jul. 10, 2018 (JP) ................................. 2018-131045

(51) Int. Cl.
*B60W 30/165* (2020.01)
*B60W 10/04* (2006.01)
*B60W 10/20* (2006.01)

(52) U.S. Cl.
CPC .......... *B60W 30/165* (2013.01); *B60W 10/04* (2013.01); *B60W 10/20* (2013.01); *B60W 2552/30* (2020.02)

(58) Field of Classification Search
CPC .... B60W 30/165; B60W 10/04; B60W 10/20; B60W 2552/30; B60W 2420/42;
(Continued)

(56) References Cited

U.S. PATENT DOCUMENTS

| 2007/0198152 A1* | 8/2007 | Endo | ...................... G08G 1/161 |
| | | | 701/41 |
| 2013/0304322 A1* | 11/2013 | Isaji | ........................ B62D 6/00 |
| | | | 701/41 |

(Continued)

FOREIGN PATENT DOCUMENTS

| JP | 2017-65473 A | 4/2017 |
| JP | 2018-24338 A | 2/2018 |
| JP | 2018024338 A * | 2/2018 |

OTHER PUBLICATIONS

International Search Report (PCT/ISA/210) issued in PCT Application No. PCT/JP2016/026464 dated Sep. 17, 2019 with English translation (five (5) pages).

(Continued)

*Primary Examiner* — Jonathan M Dager
*Assistant Examiner* — Jean W Charleston
(74) *Attorney, Agent, or Firm* — Crowell & Moring LLP

(57) ABSTRACT

The present invention provides a vehicle control device configured to obtain a distribution between first-order follow-up control and second-order follow-up control based on information on a road curvature of a road on which a preceding vehicle traveling forward of a vehicle has traveled and information on a relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory, and to output an instruction relating to steering of the vehicle for achieving (Continued)

the obtained first-order follow-up control and second-order follow-up control to a steering actuator unit relating to the steering of the vehicle.

9 Claims, 6 Drawing Sheets

(58) Field of Classification Search
CPC ..... B60W 2520/125; B60W 2554/801; B60W 2554/802; B60W 2554/805; B60W 2710/20; B62D 15/025
USPC .......................................................... 701/23
See application file for complete search history.

(56) References Cited

U.S. PATENT DOCUMENTS

| | | | |
|---|---|---|---|
| 2016/0297439 A1* | 10/2016 | Inoue | B60W 10/20 |
| 2017/0225686 A1* | 8/2017 | Takaso | G05D 1/0219 |
| 2018/0065630 A1* | 3/2018 | Tamura | B60W 30/16 |
| 2019/0092390 A1* | 3/2019 | Ide | B60W 10/18 |
| 2019/0100197 A1* | 4/2019 | Saiki | G08G 1/165 |
| 2019/0315350 A1* | 10/2019 | Oguro | B60W 30/0956 |
| 2019/0361449 A1* | 11/2019 | Ueno | B60W 50/029 |

OTHER PUBLICATIONS

Japanese-language Written Opinion (PCT/ISA/237) issued in PCT Application No. PCT/JP2016/026464 dated Sep. 17, 2019 with English translation (12 pages).

\* cited by examiner

| CONTROL METHOD | CURVATURE | INTER-VEHICLE DISTANCE | LATERAL DEVIATION OF PRECEDING VEHICLE |
|---|---|---|---|
| TRAJECTORY FOLLOW-UP | SMALL CURVATURE (STRAIGHT LINE): "MEDIUM" ·· SLOW RESPONSE<br>LARGE CURVATURE (CURVE): "HIGH" ·· NO SHORTCUT | SHORT: "LOW" ·· INFLUENCE OF LATERAL DEVIATION<br>INTERMEDIATE: "HIGH" ·· OK<br>LONG: "LOW" ·· ACCUMULATION OF ERROR | SMALL: "MEDIUM" ·· SLOW RESPONSE<br>LARGE: "HIGH" ·· NO SHORTCUT |
| YAW ANGLE FOLLOW-UP | SMALL CURVATURE (STRAIGHT LINE): "HIGH" ·· QUICK RESPONSE<br>LARGE CURVATURE (CURVE): "LOW" ·· SHORTCUT | SHORT: "MEDIUM" ·· LESS SENSITIVE TO DEVIATION<br>INTERMEDIATE: "HIGH" ·· OK<br>LONG: "MEDIUM" ·· NO ACCUMULATION OF ERROR | SMALL: "HIGH" ·· QUICK RESPONSE<br>LARGE: "MEDIUM" ·· SHORTCUT |

Fig. 4

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system.

BACKGROUND ART

In Patent Literature 1, the following configuration is disclosed. In a steering assist control device configured to calculate, as a position of an object to be followed, a relative position of the object forward of an own vehicle with respect to the own vehicle, obtain the calculated object position a plurality of times on a time axis to store the calculated object positions in a buffer memory, and calculate a control target value for steering based on a movement trajectory of the object to be followed, which is estimated based on the plurality of object positions stored in the buffer memory, a cycle for obtaining the object position is adjusted based on a spaced-apart distance between the own vehicle and the object to be followed and a speed of the own vehicle so as to estimate the movement trajectory under a state in which the object position calculated at the time when the object to be followed was located backward of a current position of the own vehicle is stored in the buffer memory.

CITATION LIST

Patent Literature

PTL 1: JP 2017-065473 A

SUMMARY OF INVENTION

Technical Problem

Incidentally, in follow-up steering control of calculating a target value relating to steering so that an own vehicle follows a preceding vehicle, in a case in which an image of the forward preceding vehicle is taken by a camera mounted on the own vehicle, when an inter-vehicle distance between the own vehicle and the preceding vehicle is short, the image of the entire preceding vehicle cannot be taken by the camera, and an error thus occurs in a detection value of a lateral position of the preceding vehicle. As a result, a fluctuation is more liable to occur in an instruction steering angle due to the error.

Meanwhile, in a case in which the inter-vehicle distance between the own vehicle and the preceding vehicle is long, an error in a yaw rate detection value to be used to calculate the movement trajectory is accumulated, and the calculation of the movement trajectory consequently becomes inaccurate, which may cause a fluctuation of the instruction steering angle.

The present invention has an object to provide a vehicle control device, a vehicle control method, and a vehicle control system capable of suppressing a fluctuation of an instruction relating to steering in follow-up steering control.

Solution to Problem

According to one embodiment of the present invention, in one aspect thereof, there is provided a vehicle control device configured to obtain a distribution between first-order follow-up control and second-order follow-up control based on information on a road curvature of a road on which a preceding vehicle traveling forward of a vehicle has traveled and information on a relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory, and to output an instruction relating to steering of the vehicle for achieving the obtained first-order follow-up control and second-order follow-up control to a steering actuator unit relating to the steering of the vehicle.

According to one embodiment of the present invention, the fluctuation of the instruction relating to the steering in the follow-up steering control is suppressed, to thereby be able to increase the performance of the follow-up steering control.

BRIEF DESCRIPTION OF DRAWINGS

FIG. 4 is a table for showing evaluation patterns of a trajectory follow-up method and a yaw angle follow-up method.

DESCRIPTION OF EMBODIMENTS

Figure 1:
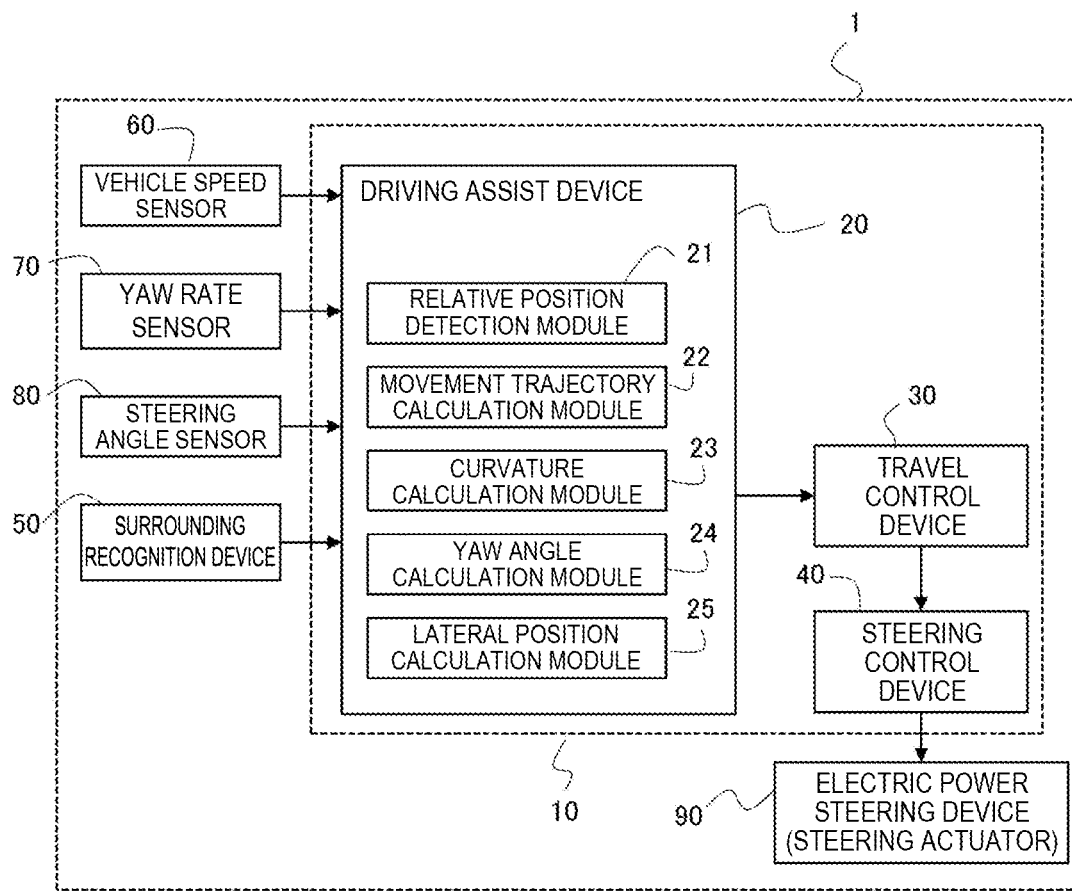
FIG. 1 is a block diagram for illustrating a vehicle control system.

Referring to the drawings, description is now given of a vehicle control device, a vehicle control method, and a vehicle control system according to an embodiment of the present invention.

FIG. 1 is a configuration block diagram for illustrating an aspect of the vehicle control system according to the embodiment of the present invention.

A vehicle control system 10 of FIG. 1 is a driving assist system having a function of follow-up steering control of causing a vehicle (own vehicle) 1 to follow a forward preceding vehicle.

The vehicle control system 10 includes a driving assist control device 20, a travel control device 30, a steering control device 40, and an external world recognition device 50.

The driving assist control device 20, the travel control device 30, and the steering control device 40 are electronic control devices each provided with a microcomputer including, for example, a microprocessor unit (MPU), a read only memory (ROM), and a random access memory (RAM), and form a controller of the vehicle control system 10.

The external world recognition device 50 is an external world recognition unit configured to use external world detection devices such as a camera, a millimeter wave radar, and a laser radar to recognize an external environment of the vehicle 1.

The external world recognition device 50, for example, applies image matching processing to a pair of left and right images of an object taken by a stereo camera to calculate a displacement amount between each pair of pixels at positions corresponding to each other between the pair of left and right images, that is, a parallax, to thereby generate a distance image in which each point indicates a distribution of distance information as brightness or the like corresponding to the parallax.

After that, the external world recognition device 50 converts each point on the distance image to coordinates in a 3D real space having an X axis in a vehicle lengthwise direction, that is, a distance direction, a Y axis in a vehicle widthwise direction, that is, a left and right direction, and a Z axis in a vehicle height direction.

As a result of the conversion, the external world recognition device 50 recognizes relative positional relationships between the vehicle 1 and objects to be imaged such as partition lines (for example, a roadway center line and roadway outer side lines) of a road on which the vehicle 1 travels, obstacles, and a preceding vehicle traveling forward of the vehicle 1.

The external world recognition device 50 converts a specific point on a rear surface of the preceding vehicle of the distance image to an X coordinate and a Y coordinate with respect to the vehicle 1 defined as a origin in the recognition processing for the relative positional relationship between the preceding vehicle and the vehicle 1, and sets the converted X coordinate value and Y coordinate value as information on a relative position of the preceding vehicle with respect to the vehicle 1.

The external world recognition device 50 sets the specific point on the rear surface of the preceding vehicle as, for example, a center position on the rear surface of the preceding vehicle in the vehicle widthwise direction. Moreover, the external world recognition device 50 sets the origin of the X and Y coordinates as, for example, a center point of the vehicle 1, that is, a point at which a center line of the vehicle 1 in the vehicle widthwise direction and a center line of the vehicle 1 in the vehicle lengthwise direction intersect each other.

After that, the external world recognition device 50 outputs information on the relative positional relationships between the preceding vehicle and the like and the vehicle 1 to the driving assist control device 20.

Moreover, the vehicle 1 includes a vehicle speed sensor 60 configured to detect a vehicle speed (travel speed) V (m/s) of the vehicle 1, a yaw rate sensor 70 configured to detect a yaw rate γ (rad/s) of the vehicle 1, and a steering angle sensor 80 configured to detect a steering angle θs (deg) of an electric power steering device 90, which is a steering device capable of autonomously steering.

Further, the driving assist control device 20 inputs, together with the information on the relative positional relationships obtained by the external world recognition device 50, information on the vehicle speed V detected by the vehicle speed sensor 60, information on the yaw rate γ detected by the yaw rate sensor 70, and information on the steering angle θs detected by the steering angle sensor 80.

The driving assist control device 20 has functions, as software, such as a relative position detection module 21, a movement trajectory calculation module 22, a curvature calculation module 23, a yaw angle calculation module 24, and a lateral position calculation module 25. Moreover, the driving assist control device 20 calculates control parameters relating to setting of a target steering angle, and outputs an instruction signal corresponding to the control parameters, that is, an instruction relating to the steering, to the travel control device 30.

The travel control device 30 can mutually communicate to/from the driving assist control device 20, and receives the instruction signal corresponding to the control parameters from the driving assist control device 20. After that, the travel control device 30 obtains the target steering angle based on the instruction signal corresponding to the control parameters, and outputs to the steering control device 40 an instruction relating to the target steering angle as an instruction relating to the steering.

The steering control device 40 controls the electric power steering device 90, that is, an electric motor serving as a steering actuator, based on the input instruction relating to the target steering angle.

In this configuration, the driving assist control device 20 has a function of executing the follow-up steering control of causing the vehicle 1 to follow the forward preceding vehicle through use of two control methods different from each other. Moreover, the driving assist control device 20 switches between the two control methods or obtains a distribution between the two control methods, to thereby obtain the control parameters relating to the setting of the target steering angle, and outputs information on the obtained control parameters to the travel control device 30.

One of the two different control methods is a method involving approximating a movement trajectory of the preceding vehicle by a second-order function and obtaining a curvature component, a yaw angle component, and a lateral position, which are coefficients of an approximate expression, as the control parameters (first control parameters), that is, a trajectory follow-up method of executing second-order follow-up control of causing the vehicle 1 to follow the preceding vehicle through use of a second-order trajectory.

Moreover, another one of the two different control methods is a method involving approximating the movement trajectory from the vehicle 1 to the preceding vehicle by a first-order function and obtaining a yaw angle component, which is a coefficient of an approximate expression, as the control parameter (second control parameter), that is, a yaw angle follow-up method (shortest follow-up control method) of executing first-order follow-up control of causing the vehicle 1 to follow the preceding vehicle through use of a first-order trajectory.

When the movement trajectory of the preceding vehicle is approximated by the second-order function, a second-order coefficient of the second-order function represents the curvature component of the movement trajectory, a first-order coefficient of the second-order function represents the yaw angle component of the movement trajectory (a gradient component of the movement trajectory with respect to the own vehicle), and a 0th-order coefficient of the second-order function represents the lateral position component of the movement trajectory with respect to the vehicle 1.

Moreover, in the trajectory follow-up method, the 0th-order coefficient to the second-order coefficient are output to the travel control device 30. The travel control device 30 obtains the target steering angle so as to cause the vehicle 1 to travel along the target trajectory represented by the second-order function. That is, the trajectory follow-up method is a method of causing the vehicle 1 to follow the preceding vehicle through use of the second-order trajectory.

Meanwhile, the yaw angle follow-up method is a method of obtaining the target steering angle so as to cause the vehicle 1 to travel along a target trajectory represented by the first-order function having a yaw angle as a first-order coefficient, and is a method of causing the vehicle 1 to follow the preceding vehicle through use of the first-order trajectory.

Figure 2:
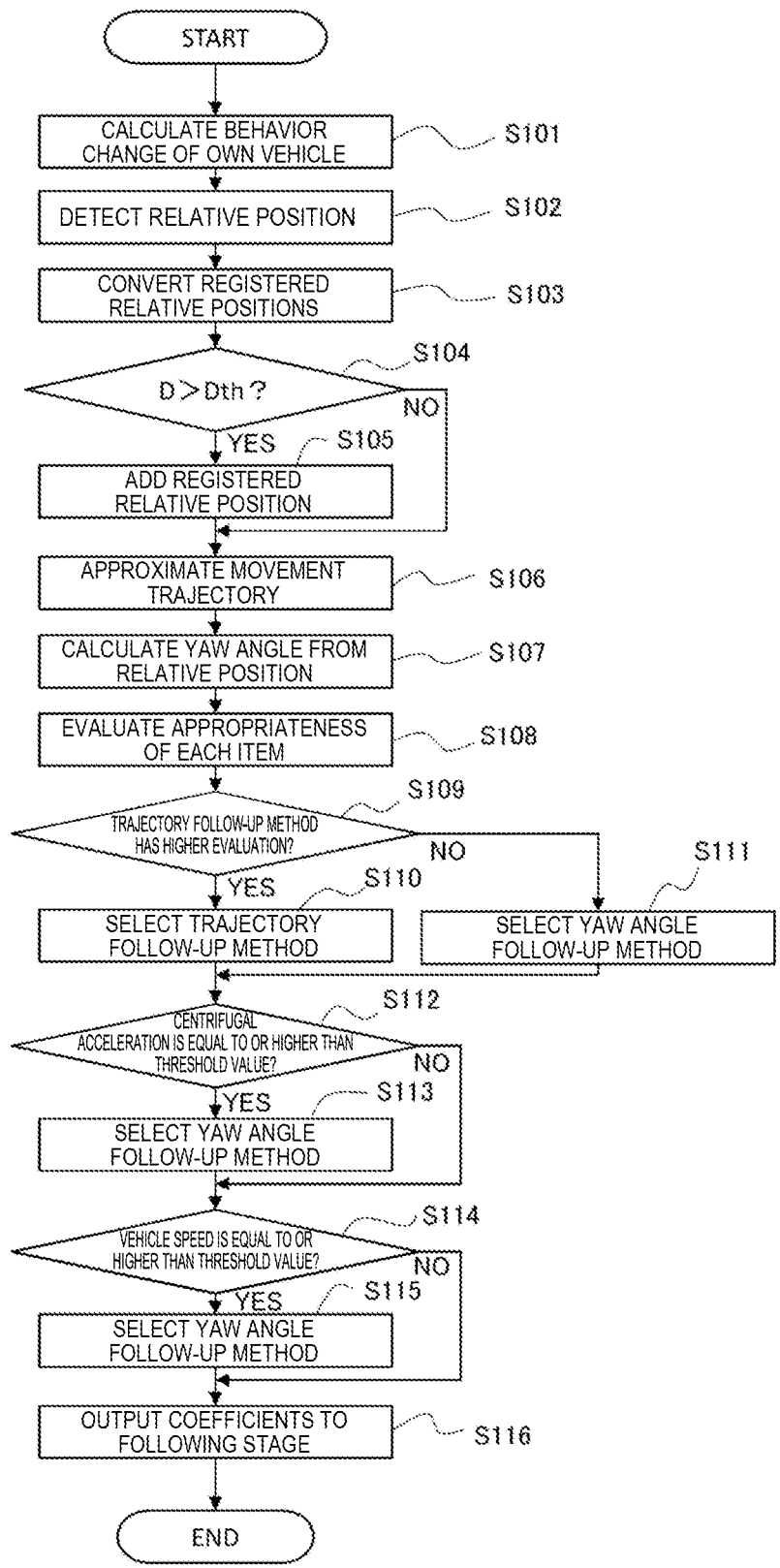
FIG. 2 is a flowchart for illustrating a procedure of follow-up steering control.

A flowchart of FIG. 2 is an illustration of one aspect of the follow-up steering control (control of switching between the trajectory follow-up method and the yaw angle follow-up method) by the driving assist control device 20.

A routine illustrated in the flowchart of FIG. 2 is executed through use of interrupt processing every certain period of time (for example, 50 ms).

In Step S101 (in the flowchart, abbreviated as "S101"; The same applies hereinafter.), the driving assist control device 20 calculates a change in behavior of the vehicle 1 per calculation cycle Ts (s).

Specifically, the driving assist control device 20 reads the vehicle speed V detected by the vehicle speed sensor 60 and the yaw rate γ detected by the yaw rate sensor 70, to thereby calculate a rotation change amount and translation change amounts of the vehicle 1.

The driving assist control device 20 can use the detection value of the steering angle θ, the detection value of the vehicle speed V, and further a wheelbase and a stability factor of the vehicle 1 to calculate the information on the yaw rate γ, in place of obtaining the information on the yaw rate γ from the yaw rate sensor 70.

Figure 3:
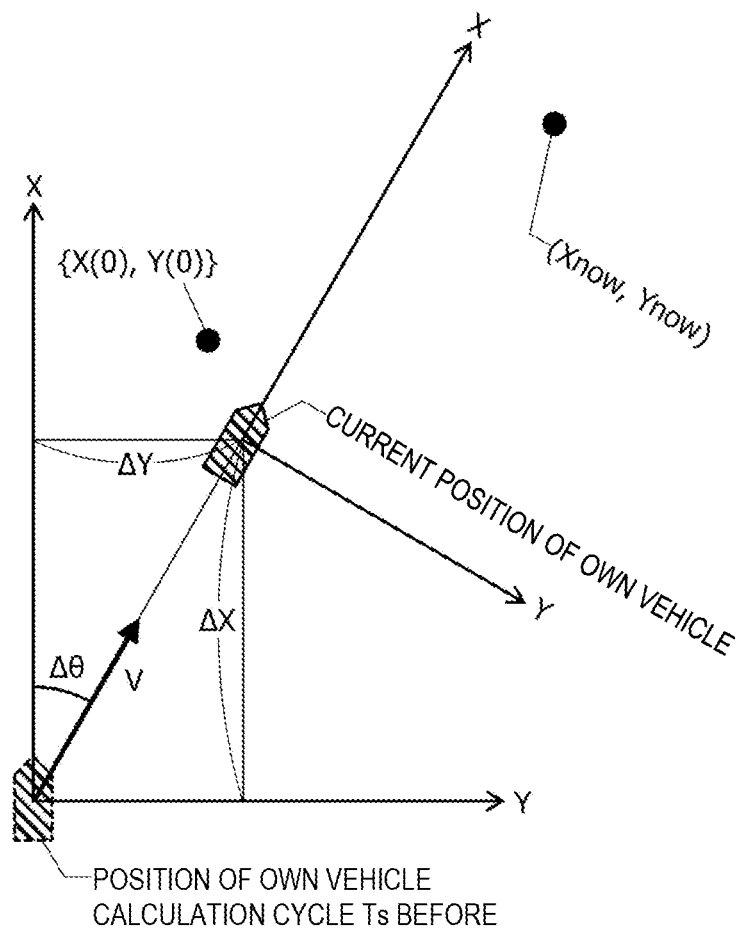
FIG. 3 is a graph for showing a rotation change amount and translation change amounts of an own vehicle.

FIG. 3 shows the rotation change amount and the translation change amounts of the vehicle 1 per calculation cycle Ts (s), that is, from a time one calculation cycle before to the current time.

As shown in FIG. 3, when the rotation change amount of the vehicle 1 is represented as $\Delta\theta$ (rad), the translation change amount of the vehicle 1 in the vehicle lengthwise direction is represented as $\Delta X$ (m), and the translation change amount of the vehicle 1 in the vehicle widthwise direction is represented as $\Delta Y$ (m), $\Delta\theta$, $\Delta X$, and $\Delta Y$ are represented by Expression 1.

$$\Delta\theta = \gamma * Ts$$

$$\Delta X = V * Ts * \cos(\Delta\theta)$$

$$\Delta Y = V * Ts * \sin(\Delta\theta) \qquad \text{[Expression (1)]}$$

In Step S102 (relative position detection module 21), the driving assist control device 20 detects the current relative position of the preceding vehicle with respect to the vehicle 1 based on the information on the relative position from the external world recognition device 50.

As shown in FIG. 3, the current relative position of the preceding vehicle with respect to the vehicle 1 is represented as an X coordinate and a Y coordinate in which a longitudinal position is Xnow and a lateral position is Ynow with respect to the current position of the vehicle 1 as the origin.

The driving assist control device 20 successively stores the relative position of the preceding vehicle with respect to the vehicle 1 detected in Step S102 in the internal memory, for example, the RAM. As a result, the detection result of the relative position becomes a registered relative position.

In Step S103, in order to estimate the movement trajectory of the preceding vehicle, the driving assist control device 20 converts all of the registered relative positions of a relative position history, which is relative position data being a time series stored in the memory, to X coordinates and Y coordinates with respect to the current position of the vehicle 1 defined as the origin in accordance with the rotation change amount and the translation change amounts calculated in Step S101, to thereby rewrite all of the registered relative positions.

When the longitudinal position and the lateral position of the registered relative position included in the relative position history are represented as X and Y, respectively, the registered relative positions X' and Y' after the coordinate conversion are represented by Expression 2.

$$Y'[n] = (Y[n] - \Delta Y) * \cos(-\Delta\theta) + (X[n] - \Delta X) * \sin(-\Delta\theta)$$

$$X'[n] = -(Y[n] - \Delta Y) * \sin(-\Delta\theta) + (X[n] - \Delta X) * \cos(-\Delta\theta) \qquad \text{[Expression (2)]}$$

In Expression 2, X[n] and Y[n] indicate the longitudinal position and the lateral position of the preceding vehicle stored "n" times before, respectively.

For example, in FIG. 3, the newest registered relative positions X[0] and Y[0] of the relative position history are represented as an X coordinate and a Y coordinate with respect to the position of the vehicle 1 at a time the calculation cycle Ts before the current time defined as the origin. Therefore, the newest registered relative positions X[0] and Y[0] of the relative position history are converted to the positions in the X coordinate and the Y coordinate with respect to the current position of the vehicle 1 defined as the origin in accordance with Expression 2.

In Step S104, the driving assist control device 20 determines whether or not a distance D (>0) between the relative position (Xnow, Ynow) detected in Step S102 and the newest registered relative position (X[0], Y[0]) of the relative position history after the conversion of the registered relative positions in Step S103 satisfies Expression 3 with respect to a threshold value Dth (>0).

$$D = \sqrt{(X[0] - Xnow)^2 + (Y[0] - Ynow)^2} > Dth \qquad \text{[Expression (3)]}$$

The comparison between the distance D and the threshold value Dth in Step S104 is processing for effectively using a memory capacity.

That is, in a case in which the relative position of the preceding vehicle with respect to the vehicle 1 has hardly changed, even when the relative position (Xnow, Ynow) newly detected for this time is added to the relative position history, the second-order function for approximating the movement trajectory of the preceding vehicle hardly changes.

Therefore, when the distance D is equal to or shorter than the threshold value Dth, the storage of the relative position (Xnow, Ynow) newly detected for this time in the memory leads to wasteful consumption of the memory capacity.

Thus, the driving assist control device 20 switches whether data on the relative position (Xnow, Ynow) newly detected for this time is to be stored in the memory or discarded based on the comparison result between the distance D and the threshold value Dth. The threshold value Dth corresponding to an interval for storing the position of the preceding vehicle is a value in accordance with the capacity of the memory for storing the registered relative positions, processing performance of the processor, and the like.

When the distance D is longer than the threshold value Dth (D>Dth), the driving assist control device 20 proceeds from Step S104 to Step S105, and executes processing of adding the data on the relative position (Xnow, Ynow) newly detected for this time to the relative position history, to thereby store the data on the relative position (Xnow, Ynow).

Meanwhile, when the distance D is equal to or shorter than the threshold value Dth (D≤Dth), the driving assist control device 20 bypasses Step S105, and proceeds from Step S104 to Step S106, and does not execute the processing of adding the data on the relative position (Xnow, Ynow)

newly detected for this time to the relative position history. That is, when the distance D is equal to or shorter than the threshold value Dth, the driving assist control device 20 does not store the data on the relative position (Xnow, Ynow) newly detected for this time, and discards the data.

In Step S105, the driving assist control device 20 stores the data on the relative position (Xnow, Ynow) detected in Step S102 in the memory, for example, the RAM, and adds the relative position as a newly registered relative position to the relative position history.

Specifically, the driving assist control device 20 rewrites the newest registered relative position (X[0], Y[0]) of the relative position history in accordance with Expression 4, and sets the relative position (Xnow, Ynow) newly detected in Step S102 for this time as the newest registered relative position (X[0], Y[0]).

$$X[0]=Xnow$$

$$Y[0]=Ynow \qquad \text{[Expression (4)]}$$

After that, the driving assist control device 20 rewrites the remaining registered relative positions (X[I], Y[I]) (I>0) of the relative position history in accordance with Expression 5, to thereby update each of the registered relative positions (X[I], Y[I]) up to now to data one calculation cycle before, and stores the updated registered relative positions (X[I], Y[I]).

The left side of Expression 5 represents the registered relative position after the rewriting. The right side of Expression 5 represents the registered relative position before the rewriting.

$$X[I+1]=X[I]$$

$$Y[I+1]=Y[I] \qquad \text{[Expression (5)]}$$

In this configuration, the memory of the driving assist control device 20 has a capacity for storing the registered relative positions until I of the registered relative position (X[I], Y[I]) reaches a maximum number Imax (positive integer).

Thus, when the oldest registered relative position (Xold, Yold) of the relative position history before the rewrite is (X[Imax], Y[Imax]), data on the registered relative position (Xold, Yold) before the rewrite is discarded.

When there is satisfied a condition that the follow-up steering control cannot be executed, for example, a condition that the external world recognition device 50 cannot recognize the preceding vehicle being the object to be followed forward of the vehicle 1, the driving assist control device 20 deletes all of the data on the registered relative positions stored in the memory.

In Step S106 (movement trajectory calculation module 22), the driving assist control device 20 calculates a second-order function Y=f(X) that approximates the movement trajectory of the preceding vehicle through use of a least squares method that uses data on a plurality of registered relative positions (X[I], Y[I]).

The second-order function Y=f(X) is represented by Expression 6 having a second-order coefficient A, a first-order coefficient B, and a 0th-order coefficient C.

$$Y=f(X)A*X^2+B*X+C \qquad \text{[Expression (6)]}$$

After that, the driving assist control device 20 calculates the curvature (1/R) of the movement trajectory of the preceding vehicle at the current longitudinal position of the vehicle 1, that is, at X=0, as the control parameter (second-order coefficient) of the curvature component, from the second-order function Y=f(X) that approximates the movement trajectory of the preceding vehicle (curvature calculation module 23).

The curvature (1/R) of the movement trajectory at X=0 is obtained through use of derivatives obtained by differentiating the second-order function Y=f(X) once and twice with respect to X as represented by Expression 7.

$$1/R=f''(0)/(1+f'(0)^2)^{3/2}=2*A/(1+B^2)^{3/2} \qquad \text{[Expression (7)]}$$

In Expression 7, the first-order coefficient B is a value close to 0, and the curvature (1/R) can thus be calculated as represented by an expression of 1/R=2×A. Thus, the driving assist control device 20 identifies the second-order coefficient A as the control parameter of the curvature component, and stores the second-order coefficient A in the memory.

Moreover, the driving assist control device 20 calculates the yaw angle φ of the movement trajectory at the current longitudinal position of the vehicle 1, that is, at X=0, as the control parameter (first-order coefficient) of the yaw angle component, from the second-order function Y=f(X) that approximates the movement trajectory of the preceding vehicle (yaw angle calculation module 24).

The yaw angle φ of the movement trajectory at X=0 is obtained from a derivative calculated by differentiating the second-order function Y=f(X) once with respect to X as represented by Expression 8. Thus, the driving assist control device 20 identifies the first-order coefficient B as the control parameter of the yaw angle component, and stores the first-order coefficient B.

$$\varnothing=f'(0)=B \qquad \text{[Expression (8)]}$$

Further, the driving assist control device 20 calculates the lateral position $Y_{X=0}$ of the movement trajectory at the current longitudinal position of the vehicle 1, that is, at X=0, as the control parameter (0th-order coefficient) of the lateral position component, from the second-order function Y=f(X) that approximates the movement trajectory of the preceding vehicle (lateral position calculation module 25)

The lateral position $Y_{X=0}$ of the movement trajectory at X=0 is the 0th-order coefficient C as represented by Expression 9. Thus, the driving assist control device 20 identifies the 0th-order coefficient C as the control parameter of the lateral position component, and stores the coefficient C in the memory.

$$Y_{X=0}=f(0)=C \qquad \text{[Expression (9)]}$$

The trajectory follow-up method sets the target steering angle of the electric power steering device 90 based on the three control parameters, which are the curvature component, the yaw angle component, and the lateral position component, and which are obtained from the second-order function Y=f(X) that approximates the movement trajectory of the preceding vehicle as described above.

That is, when the driving assist control device 20 performs the follow-up steering control through use of the trajectory follow-up method, the driving assist control device 20 approximates the movement trajectory of the preceding vehicle by the second-order function Y=f(X), sets the approximated movement trajectory as the target trajectory of the vehicle 1, and controls the steering angle so that the vehicle 1 moves along the target trajectory.

The driving assist control device 20 may set the range of the registered relative positions (X[I], Y[I]) to be used to calculate the second-order function Y=f(X) that approximates the movement trajectory of the preceding vehicle to the narrowest range from the newest value when the second-order coefficient A is obtained. When the 0th-order coefficient C is obtained, the driving assist control device 20 may set the range to the widest range from the newest value. When the first-order coefficient B is obtained, the driving assist control device 20 may set the range to a range that is equal to or wider than the range at the time when the second-order coefficient A is obtained and is equal to or narrower than the range at the time when the 0th-order coefficient C is obtained.

With this configuration, an approximated curve represented by the approximate expression having coefficients calculated for the respective ranges more closely reflects the information on the lateral position, the yaw angle, and the curvature of the actual movement trajectory of the preceding vehicle, and it is thus possible to facilitate simultaneous achievement of both of precision and responsiveness in estimation of the movement trajectory.

In Step S107, the driving assist control device 20 obtains the coefficient (first-order coefficient) corresponding to the yaw angle based on the longitudinal position Xnow and the lateral position Ynow of the preceding vehicle.

The first-order coefficient corresponding to the yaw angle obtained in Step S107 is a control parameter to be used in the yaw angle follow-up method. In the yaw angle follow-up method, the curvature component and the lateral position component are not used, and the curvature component and the lateral position component are thus each set to zero as represented by Expression 10.

$$1/R = f''(0) = 0$$

$$\varnothing = f'(0) = Ynow/Xnow$$

$$Y_{X=0} = f(0) = 0 \qquad [\text{Expression (10)}]$$

The yaw angle follow-up method uses only the yaw angle obtained based on the longitudinal position Xnow and the lateral position Ynow, which indicate the current relative position of the preceding vehicle with respect to the vehicle 1, as the control parameter to set the target steering angle of the electric power steering device 90.

That is, in the yaw angle follow-up method, the target trajectory is generated by a first-order function (Y=φX) having the yaw angle φ as a first-order coefficient, and the steering angle is controlled so that the vehicle 1 moves along the target trajectory.

As described above, the driving assist control device 20 obtains the curvature component, the yaw angle component, and the lateral position component, which are the three control parameters in the trajectory follow-up method, and further obtains the yaw angle component, which is the one control parameter in the yaw angle follow-up method.

After that, the driving assist control device 20 switches between the trajectory follow-up method and the yaw angle follow-up method.

In Step S108, the driving assist control device 20 evaluates respective degrees of appropriateness for the trajectory follow-up method and the yaw angle follow-up method based on conditions such as states of a traveling road and the preceding vehicle.

In the case of the trajectory follow-up method, when the inter-vehicle distance is long, an error of the yaw rate sensor is accumulated, resulting in a fluctuation of the instruction steering angle, and when the inter-vehicle distance is short, a detection error of the lateral position of the preceding vehicle occurs, resulting in a fluctuation of the instruction steering angle. Meanwhile, in the yaw angle follow-up method, the control is provided so as to follow the preceding vehicle while selecting the shortest distance, and a shortcut of a travel line of the vehicle 1 may thus occur at a curve.

Thus, the driving assist control device 20 selects a control method more appropriate for the conditions at the current time so as to compensate for the defects of the control methods, and controls the steering angle in accordance with the control parameters obtained in the selected method.

FIG. 4 is a table for showing an aspect of evaluation patterns of the respective control methods.

In FIG. 4, the road curvature, the distance (inter-vehicle distance) to the preceding vehicle, and a lateral deviation amount of the preceding vehicle with respect to the vehicle 1 are used as evaluation conditions, and the degree of appropriateness of each control method is evaluated as three levels, which are "high," "medium," and "low," for each evaluation condition.

The control method is switched by comparing the degrees of appropriateness of the respective control methods with each other as described later. Thus, the three levels of evaluation, which are "high," "medium," and "low," of the degree of appropriateness correspond to weights of the respective control methods. Consequently, the weight is increased as the degree of appropriateness increases.

The driving assist control device 20 broadly classifies the traveling road into a straight line (small curvature) and a curve (large curvature) for the condition of the road curvature.

As described above, in the yaw angle follow-up method, the likelihood of the shortcut of the travel line (inward displacement of the travel line) increases as the curvature of the curve increases (as the curve becomes sharper), and it is thus not preferred to employ the yaw angle follow-up method at a curve.

Therefore, the driving assist control device 20 evaluates the degree of appropriateness of the yaw angle follow-up method as "low" at a curve based on the likelihood of the shortcut.

Moreover, in the trajectory follow-up method, control response is low on a straight road, and the driving assist control device 20 thus evaluates the degree of appropriateness of the trajectory follow-up method as "medium" on a straight road.

Further, the trajectory follow-up method can suppress the shortcut at a curve, and the driving assist control device 20 thus evaluates the degree of appropriateness of the trajectory follow-up method at a curve as "high." Moreover, the driving assist control device 20 evaluates the degree of appropriateness of the yaw angle follow-up method on a straight road as "high" based on high responsiveness.

Moreover, the driving assist control device 20 broadly classifies the condition of the inter-vehicle distance into "short," "intermediate," and "long."

In the case of the trajectory follow-up method, when the inter-vehicle distance is short, the image of the entire preceding vehicle cannot be taken by the camera, and the detection error thus occurs in the lateral position of the preceding vehicle. As a result, a fluctuation of the instruction steering angle is more liable to occur due to the error. Moreover, in the case of the trajectory follow-up method, when the inter-vehicle distance is long, the error in the yaw rate detection value to be used to calculate the movement trajectory is accumulated, and the accumulated error causes a fluctuation of the instruction steering angle.

Thus, the driving assist control device 20 evaluates the degree of appropriateness of the trajectory follow-up method as "low" when the inter-vehicle distance is short and when the inter-vehicle distance is long. The driving assist control device 20 evaluates the degree of appropriateness of the trajectory follow-up method as "high" when the inter-vehicle distance is intermediate.

Meanwhile, in the yaw angle follow-up method, even when the inter-vehicle distance is short and the detection error in the lateral position of the preceding vehicle occurs, influence of the error is relatively low. Moreover, the sensor error is not accumulated when the inter-vehicle distance is long.

Thus, the driving assist control device 20 evaluates the degree of appropriateness of the yaw angle follow-up method as "medium" when the inter-vehicle distance is short and when the inter-vehicle distance is long. The driving assist control device 20 evaluates the degree of appropriateness of the yaw angle follow-up method as "high" when the inter-vehicle distance is intermediate.

Further, the driving assist control device 20 broadly classifies the condition of the lateral deviation amount of the preceding vehicle with respect to the vehicle 1 into a small lateral deviation amount and a large lateral deviation amount.

The yaw angle follow-up method quickly responds to the lateral deviation of the preceding vehicle, but, when the lateral deviation amount is large, the shortcut of the travel line may occur. Meanwhile, the trajectory follow-up method has such a characteristic that even when the lateral deviation amount is large, the shortcut can be suppressed, but the response to the lateral deviation of the preceding vehicle is slow.

Thus, the driving assist control device 20 evaluates the degree of appropriateness of the yaw angle follow-up method as "medium" when the lateral deviation amount is large, and evaluates the degree of appropriateness as "high" when the lateral deviation amount is small.

Further, the driving assist control device 20 evaluates the degree of appropriateness of the trajectory follow-up method as "high" when the lateral deviation amount is large, and evaluates the degree of appropriateness as "medium" when the lateral deviation amount is small.

In Step S109, the driving assist control device 20 determines which control method of the trajectory follow-up method and the yaw angle follow-up method has a larger number of "high" evaluations in the respective items, which are the road curvature, the distance (inter-vehicle) to the preceding vehicle, and the lateral deviation amount of the preceding vehicle.

In Step S109, when, for example, an evaluation point of "high" is 5 points, an evaluation point of "medium" is 3 points, and evaluation point of "low" is 1 point, the driving assist control device 20 can determine the control method having a larger sum of the evaluation points given in the respective items.

Moreover, when the number of "high" evaluations of the trajectory follow-up method is larger than the number of "high" evaluations of the yaw angle follow-up method (when the sum of the evaluation points of the trajectory follow-up method is larger than the sum of the evaluation points of the yaw angle follow-up method), the driving assist control device 20 proceeds to Step S110.

In Step S110, the driving assist control device 20 selects the trajectory follow-up method as the method for the follow-up steering control, and sets the curvature component (second-order coefficient), the yaw angle component (first-order coefficient), and the lateral position component (0th-order component) obtained in the trajectory follow-up method as the control parameters to be output to the travel control device 30 at the following stage.

Meanwhile, when the number of "high" evaluations of the yaw angle follow-up method is larger than the number of "high" evaluations of the trajectory follow-up method (when the sum of the evaluation points of the yaw angle follow-up method is larger than the sum of the evaluation points of the trajectory follow-up method), the driving assist control device 20 proceeds to Step S111.

In Step S111, the driving assist control device 20 selects the yaw follow-up method as the method for the follow-up steering control, and sets the yaw angle component (first-order coefficient) obtained in the yaw follow-up method as the control parameter to be output to the travel control device 30 at the following stage, and sets the curvature component (second-order coefficient) and the lateral position component (0th-order component) to zero.

When the numbers of "high" evaluations are the same (or the sums of the evaluation points are the same), the driving assist control device 20 may select a control method (for example, the trajectory follow-up method) determined in advance as a standard control method of the trajectory follow-up method and the yaw angle follow-up method.

The selections of the control methods in Step S110 and Step S111 are preliminary selections, and the driving assist control device 20 finally determines the control method based on conditions of a centrifugal acceleration and the vehicle speed in Step 112 and the subsequent steps.

In Step S112, the driving assist control device 20 determines whether or not a follow-up delay equal to or larger than a predetermined value occurs when the follow-up steering control is performed by the trajectory follow-up method.

In this case, the driving assist control device 20 calculates the centrifugal acceleration from a curvature radius "r" and the vehicle speed V obtained when the vehicle 1 is caused to follow the preceding vehicle, and determines that a follow-up delay equal to or larger than the predetermined value occurs when the calculated centrifugal acceleration is equal to or higher than a threshold value ACth (ACth>0).

That is, the driving assist control device 20 determines that the response delay equal to or larger than the predetermined value occurs in the follow-up steering control in the trajectory follow-up method when a condition represented by Expression 11 is satisfied.

In Expression 11, abs (a) represents a function that returns an absolute value of a variable α. The threshold value ACth is, for example, a value of about 1.5 m/s'.

$$\text{abs(centrifugal acceleration)}=\text{abs}(V*V/r)>ACth \qquad \text{[Expression (11)]}$$

When the centrifugal acceleration is equal to or higher than the threshold value ACth, the driving assist control device 20 proceeds to Step S113, and selects the yaw angle component (first-order coefficient) obtained in the yaw angle follow-up method as the control parameter to be output to the travel control device 30 at the following stage.

That is, even in the case in which the driving assist control device 20 selects the trajectory follow-up method in Step S110, when the driving assist control device 20 predicts that the response delay equal to or larger than the predetermined value occurs in the trajectory follow-up method, the driving assist control device 20 switches the trajectory follow-up method to the yaw angle follow-up method having a quicker response than that of the trajectory follow-up method.

Meanwhile, when the centrifugal acceleration is lower than the threshold value ACth, the driving assist control device 20 bypasses Step S113, and proceeds to Step S114.

That is, when the centrifugal acceleration is lower than the threshold value ACth, the follow-up steering control can be performed at a sufficient response speed even in the trajectory follow-up method, and the driving assist control device 20 thus maintains the selection of the control method in Step S110 or Step S111.

In Step S114, the driving assist control device 20 determines whether or not the vehicle speed V is equal to or higher than a threshold value Vth.

The state in which the vehicle speed V is equal to or higher than the threshold value Vth is a state in which high responsiveness of the follow-up steering control is required.

Therefore, when the vehicle speed V is equal to or higher than the threshold value Vth, the driving assist control device 20 proceeds to Step S115, and selects the yaw angle component (first-order coefficient) obtained in the yaw angle follow-up method as the control parameter to be output to the travel control device 30 at the following stage.

That is, in the case in which the driving assist control device 20 selects the trajectory follow-up method in Step S110, even when the centrifugal acceleration is lower than the threshold value ACth, but the vehicle speed V is equal to or higher than the threshold value Vth, the driving assist control device 20 switches the trajectory follow-up method to the yaw angle follow-up method in order to suppress a decrease in responsiveness of the follow-up steering control.

Meanwhile, when the vehicle speed V is lower than the threshold value Vth, the follow-up steering control can be performed at sufficient responsiveness even in the trajectory follow-up method, and the driving assist control device 20 thus bypasses Step S115, to thereby maintain the previous selection of the control method.

Thus, in the case in which the driving assist control device 20 selects the trajectory follow-up method in Step S110, when the centrifugal acceleration is lower than the threshold value ACth, and the vehicle speed V is lower than the threshold value Vth, the driving assist control device 20 finally selects the trajectory follow-up method as the control method for the follow-up steering control. In the case in which the driving assist control device 20 selects the yaw angle follow-up method in Step S111, the driving assist control device 20 finally selects the yaw angle follow-up method as the control method for the follow-up steering control regardless of the conditions of the centrifugal acceleration and the vehicle speed V.

The driving assist control device 20 may first determine whether or not to select the yaw angle follow-up method based on the conditions of the centrifugal acceleration and the vehicle speed V. When both of the centrifugal acceleration and the vehicle speed V are lower than the respective threshold values, the driving assist control device 20 may select any one of the trajectory follow-up method and the yaw angle follow-up method based on the evaluation patterns of FIG. 4.

Moreover, the driving assist control device 20 may set degrees of appropriateness (may assign the evaluation points) also to the conditions of the centrifugal acceleration and the vehicle speed V, and may select any one of the trajectory follow-up method and the yaw angle follow-up method based on an overall evaluation in combination with the evaluation of the degrees of appropriateness of the curvature, the inter-vehicle distance, and the lateral deviation.

As described above, the trajectory follow-up method has the characteristic that, when the inter-vehicle distance is short, the detection error occurs in the lateral position of the preceding vehicle and the instruction steering angle thus fluctuates, and when the inter-vehicle distance is long, the error in the yaw-rate detection value to be used to calculate the movement trajectory is accumulated and the accumulated error causes the fluctuation of the instruction steering angle. Moreover, the yaw angle follow-up method has the characteristic that the responsiveness is higher than that of the trajectory follow-up method, but the shortcut of the travel line occurs.

Thus, the driving assist control device 20 determines which of the trajectory follow-up method and the yaw angle follow-up method is more appropriate under the current travel conditions based on the respective conditions of the curvature (straight or curve), the inter-vehicle distance, the lateral deviation of the preceding vehicle, the centrifugal acceleration, and the vehicle speed, selects a more appropriate control method, and applies the selected control method to the follow-up steering control.

As a result, the vehicle 1 (own vehicle) can be caused to follow the preceding vehicle at a sufficient response while suppressing the fluctuation of the instruction steering angle and the shortcut of the travel line, and performance of the follow-up steering control can thus be increased.

Incidentally, the driving assist control device 20 may execute weighting of changing a weight of the trajectory follow-up method and a weight of the yaw angle follow-up method in accordance with the travel conditions, and may combine the trajectory follow-up method and the yaw angle follow-up method for use at a distribution based on the weighting.

Figure 5:
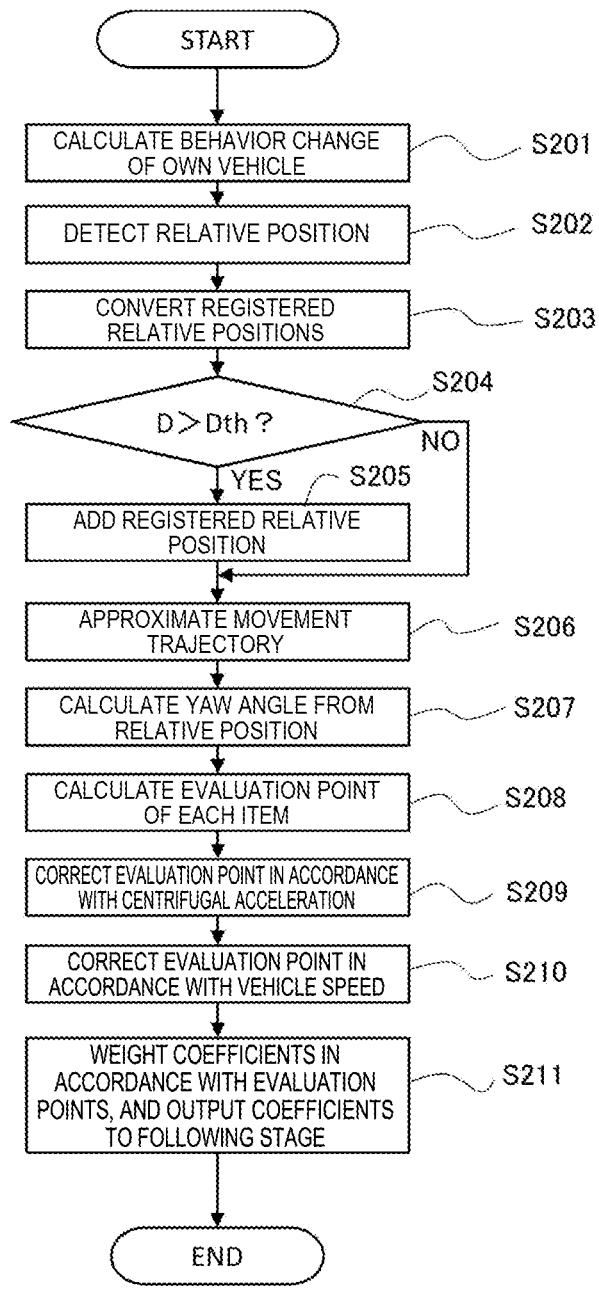
FIG. 5 is a flowchart for illustrating a procedure of the follow-up steering control.

A flowchart of FIG. 5 is a flowchart for illustrating an aspect of the follow-up steering control of combining both of the trajectory follow-up method and the yaw angle follow-up method for use at the distribution based on the weighting.

Details of processing in Step S201 to Step S207 of the flowchart of FIG. 5 are the same as those in Step S101 to Step S107 of the flowchart of FIG. 2, and a detailed description of Step S201 to Step S207 is thus omitted.

In Step S208, the driving assist control device 20 refers to the evaluation patterns of FIG. 4, to thereby evaluate the appropriateness of each control method as in Step S108.

In this case, the driving assist control device 20 gives the evaluation point to each control method in each evaluation condition of the evaluation at the three levels, which are "high," "medium," and "low," of the degree of appropriateness.

For example, the evaluation point is 5 points when the degree of appropriateness is "high." The evaluation point is 3 points when the degree of appropriateness is "medium." The evaluation point is 1 point when the degree of appropriateness is "low."

After that, the driving assist control device 20 aggregates, for each control method, the evaluation points in the respective conditions, which are the curvature, the inter-vehicle distance, and the lateral deviation of the vehicle, assigns an aggregation result of the trajectory follow-up method to C1, and assigns an aggregation result of the yaw angle follow-up method to C2.

That is, the aggregated value C1 is a sum of the evaluation point in the condition of the curvature in the trajectory follow-up method, the evaluation point in the condition of the inter-vehicle distance in the trajectory follow-up method, and the evaluation point in the condition of the lateral deviation of the vehicle in the trajectory follow-up method. The aggregated value C2 is a sum of the evaluation point in the condition of the curvature in the yaw angle follow-up method, the evaluation point in the condition of the inter-vehicle distance in the yaw angle follow-up method, and the evaluation point in the condition of the lateral deviation of the preceding vehicle in the yaw angle follow-up method. Each of the aggregated values C1 and C2 of the evaluation points indicates that the degree of appropriateness increases as the aggregated value increases.

After that, in Step S209, the driving assist control device 20 obtains a correction value ΔC2ac (ΔC2ac≥0) for the evaluation-point aggregated value C2 in the yaw angle follow-up method in accordance with the centrifugal acceleration, and updates the evaluation-point aggregated value C2 to a result of the addition of the correction value ΔC2ac to the evaluation-point aggregated value C2 obtained in Step S208.

Figure 6:
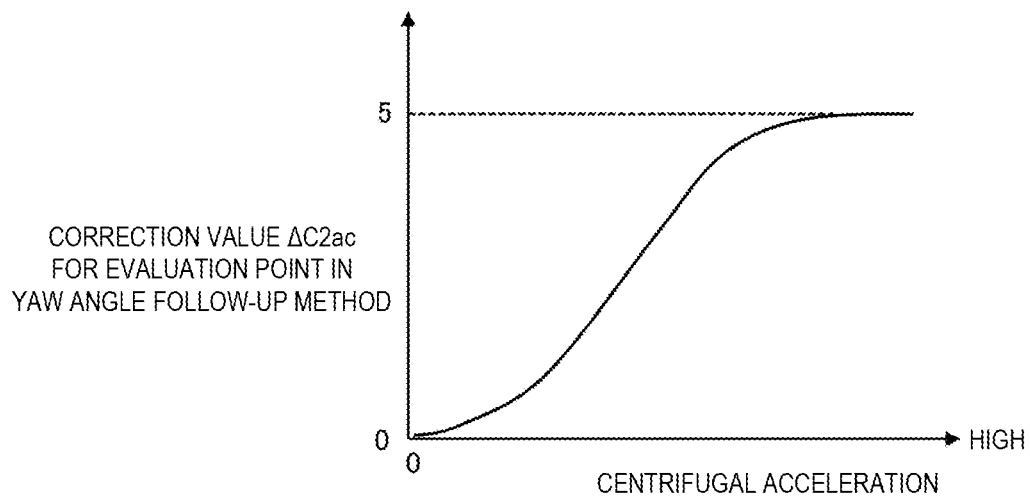
FIG. 6 is a graph for showing a correlation between a correction value for evaluation points and a centrifugal acceleration in the yaw angle follow-up method.

FIG. 6 shows a correlation between the centrifugal acceleration and the correction value ΔC2ac.

The maximum value of the correction value ΔC2ac is 5 points, which is the same as the evaluation point obtained when the degree of appropriateness is "high" in Step S208, and gradually increases from 0 points, which is the minimum value, to 5 points, which is the maximum value (0≤ΔC2ac≤5) as the centrifugal acceleration increases.

This is because, as the centrifugal acceleration increases, the response of the trajectory follow-up method decreases and the appropriateness of the yaw angle follow-up method relatively increases, and the driving assist control device 20 more greatly corrects the evaluation-point aggregated value C2 when the centrifugal acceleration is high, to thereby increase the weight of the yaw angle follow-up method to suppress the occurrence of the response delay.

After that, in Step S210, the driving assist control device 20 obtains a correction value ΔC2vs (ΔC2vs≥0) for the evaluation-point aggregated value C2 in the yaw angle follow-up method in accordance with the vehicle speed V, and updates the evaluation-point aggregated value C2 to a result of the addition of the correction value ΔC2vs to the corrected evaluation-point aggregated value C2, which is the correction value ΔC2ac obtained in Step S209.

Figure 7:
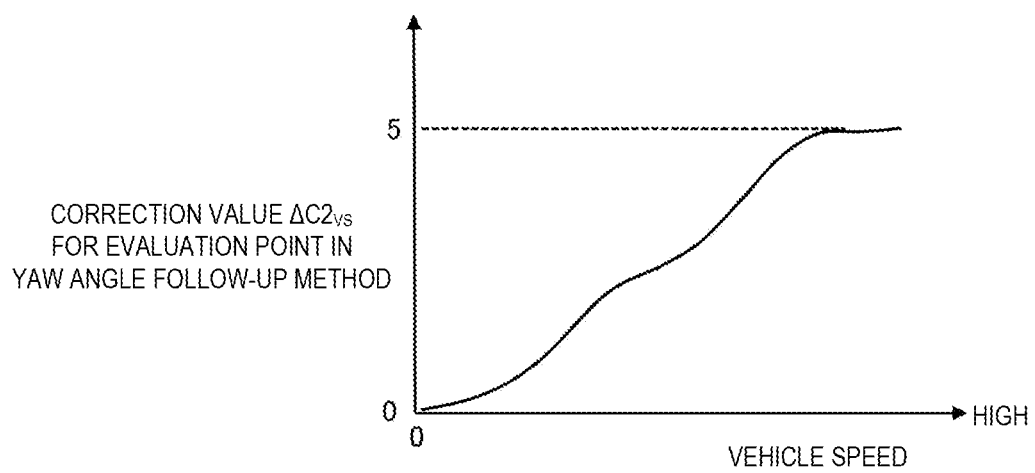
FIG. 7 is a graph for showing a correlation between the correction value for the evaluation points and a vehicle speed in the yaw angle follow-up method.

FIG. 7 shows a correlation between the vehicle speed and the correction value ΔC2vs.

The maximum value of the correction value ΔC2vs is 5 points, which is the same as the evaluation point obtained when the degree of appropriateness is "high" in Step S208, and gradually increases from 0 points, which is the minimum value, to 5 points, which is the maximum value (0≤ΔC2vs≤5) as the vehicle speed V increases. This is because, as the vehicle speed V increases, the response of the trajectory follow-up method decreases and the appropriateness of the yaw angle follow-up method relatively increases, and the driving assist control device 20 more greatly corrects the evaluation-point aggregated value C2 when the vehicle speed is high, to thereby increase the weight of the yaw angle follow-up method to suppress the occurrence of the response delay.

In Step S211, the driving assist control device 20 weights the respective coefficients (curvature component, yaw angle component, and lateral position component) obtained in the trajectory follow-up method and the respective coefficients (curvature component, yaw angle component, and lateral position component) obtained in the yaw angle follow-up method by the evaluation-point aggregated values C1 and C2, to thereby determine the coefficients to be output to the travel control device 30 at the following stage.

In the case of the yaw angle follow-up method, the curvature component (second-order coefficient) and the lateral position component (0th-order coefficient) are zero.

The driving assist control device 20 calculates the respective coefficients (curvature component, yaw angle component, and lateral position component) to be output as the control parameters to the travel control device 30 in accordance with Expression 12.

In Expression 12, the curvature component obtained in the trajectory follow-up method is represented by $[1/R]_{tr}$, the yaw angle component is represented by $[\varphi]_{tr}$, and the lateral position component is represented by $[Y_{x=0}]_{tr}$. Moreover, the curvature component obtained in the yaw angle follow-up method is represented by $[1/R]_{ya}$, the yaw angle component is represented by $[\varphi]_{ya}$, and the lateral position component is represented by $[Y_{x=0}]_{ya}$.

Curvature to be output=$[1/R]_{tr}*C1/(C1+C2)+[1/R]_{ya}*C2/(C1+C2)$

Yaw angle to be output=$[\varphi]_{tr}*C1/(C1+C2)+[\varphi]_{ya}*C2/(C1+C2)$

Lateral position to be output=$[Y_{x=0}]_{tr}*C1/(C1+C2)+[Y_{x=0}]_{ya}*C2/(C1+C2)$ [Expression (12)]

$[1/R]_{ya}$ and $[Y_{x=0}]_{ya}$ are zero in the yaw angle follow-up method, and the driving assist control device 20 calculates the respective coefficients to be output as the control parameters to the travel control device 30 in accordance with Expression 13.

Curvature to be output=$[1/R]_{tr}*C1/(C1+C2)$

Yaw angle to be output=$[\varphi]_{tr}*C1/(C1+C2)+[\varphi]_{ya}*C2/(C1+C2)$

Lateral position to be output=$[Y_{x=0}]_{tr}*C1/(C1+C2)$ [Expression (13)]

That is, the respective coefficients to be output as the control parameters to the travel control device 30 approach the coefficients in the yaw angle follow-up method as the evaluation-point aggregated value C1 decreases with respect to the evaluation-point aggregated value C2, and approach the coefficients in the trajectory follow-up method as the evaluation-point aggregated value C1 increases with respect to the evaluation-point aggregated value C2.

With the follow-up steering control illustrated in the flowchart of FIG. 5, the driving assist control device 20 obtains the degree of appropriateness of the trajectory follow-up method and the degree of appropriateness of the yaw angle follow-up method in the respective conditions, which are the curvature, the inter-vehicle distance, the lateral deviation of the preceding vehicle, the centrifugal acceleration, and the vehicle speed, and weights the respective coefficients obtained in the respective control methods in accordance with the degrees of appropriateness of the respective control methods, to thereby finally determine the coefficients (control parameters) to be output to the travel control device 30.

That is, the driving assist control device 20 combines the trajectory follow-up method and the yaw angle follow-up method for use, to thereby be able to perform the follow-up steering control while the defects of the methods are mutually compensated for. Therefore, the fluctuation of the instruction steering angle and the shortcut of the travel line can be suppressed while making use of the smooth responsiveness in the trajectory follow-up method and the high responsiveness in the yaw angle follow-up method. Consequently, the performance of the follow-up steering control can be increased.

The processing of determining the distribution between the trajectory follow-up method and the yaw angle follow-up method includes switching to any one of the trajectory follow-up method and the yaw angle follow-up method, to thereby perform the follow-up steering control. For example, when the weight of the trajectory follow-up method is 100% and the weight of the yaw angle follow-up method is 0%, the driving assist control device 20 performs the follow-up steering control in the trajectory follow-up method.

Each of the technical ideas described in the embodiment is not limited to individual application, and may be combined as appropriate unless a conflict occurs.

Further, although the details of the present invention are specifically described above with reference to the preferred embodiment, it is apparent that persons skilled in the art may adopt various modifications based on the basic technical concepts and teachings of the present invention.

In the above-mentioned embodiment, the driving assist control device 20 determines the appropriateness of each of the trajectory follow-up method and the yaw angle follow-up method based on the curvature, the inter-vehicle distance, the lateral deviation of the preceding vehicle, the centrifugal acceleration, and the vehicle speed, but may determine the appropriateness based on at least one of those travel conditions.

Moreover, the driving assist control device 20 may switch the trajectory follow-up method to the yaw follow-up method, or may change the weight of the yaw angle follow-up method to a larger value based on an increase in the fluctuation of the instruction steering angle.

Moreover, the driving assist control device 20 may switch between the trajectory follow-up method and the yaw follow-up method or change the weights of both of the control methods in accordance with a magnitude of a friction coefficient of a road surface.

Moreover, the evaluation-point aggregated value C1 (C1>0) of the trajectory follow-up method and the evaluation-point aggregated value C2 (C2>0) of the yaw follow-up method may be set to fixed values so that the weights of both of the control methods are fixed, and the control parameters of the follow-up steering control may then be determined.

Moreover, the driving assist control device 20 may evaluate the degree of appropriateness of the trajectory follow-up method and the degree of appropriateness of the yaw angle follow-up method for each coefficient, and may determine a different weight for each coefficient, to thereby obtain the final coefficients.

Moreover, the driving assist control device 20 may weight each evaluation item such as the curvature or the inter-vehicle distance. The weighting for each evaluation item may be achieved by, for example, using a different maximum value of the evaluation point for each evaluation item.

Moreover, when an absolute value ΔC of a difference between the evaluation-point aggregated value C1 and the evaluation-point aggregated value C2 is equal to or larger than a threshold value ΔCth, the driving assist control device 20 may select any one of the trajectory follow-up method and the yaw angle follow-up method. When the absolute value ΔC of a difference is smaller than the threshold value ΔCth, the driving assist control device 20 may weight the trajectory follow-up method and the yaw angle follow-up method in accordance with the evaluation-point aggregated values C1 and C2.

Description is now given of technical ideas that may be understood from the embodiment described above.

In one aspect thereof, a steering assist device is configured to:

input information on an external environment of an own vehicle obtained by a surrounding recognition unit and information on a behavior of the own vehicle obtained by a sensor device;

obtain a relative position of a preceding vehicle forward of the own vehicle with respect to the own vehicle based on the information on the external environment and the information on the behavior of the own vehicle, and update and store time-series data on the relative position;

approximate, by a second-order function, a movement trajectory of the preceding vehicle based on the time-series data on the relative position, to thereby obtain, as a first control parameter, a component of a target trajectory of the own vehicle;

approximate, by a first-order function, a movement trajectory from the own vehicle to the preceding vehicle, to thereby obtain, as a second control parameter, a component of the target trajectory of the own vehicle; and output, to a steering actuator unit of the own vehicle, an instruction relating to steering based on a third parameter, the third parameter being obtained by determining a distribution between the first control parameter and the second control parameter.

In a preferred aspect of the steering assist device, the third parameter is obtained through weighting in which a weight of the first control parameter is set to be larger than a weight of the second control parameter in accordance with an increase in a curvature of a road.

Moreover, in a preferred aspect of the steering assist device, the third control parameter is obtained through weighting in which the weight of the second control parameter is set to be larger than the weight of the first control parameter in accordance with an increase, from a predetermined intermediate value, in an inter-vehicle distance between the preceding vehicle and the own vehicle, and the weight of the second control parameter is set to be larger than the weight of the first control parameter in accordance with a decrease in the inter-vehicle distance from the predetermined intermediate value.

Moreover, in a preferred aspect of the steering assist device, the third parameter is obtained through weighting in which the weight of the first control parameter is set to be larger than the weight of the second control parameter in accordance with an increase in a lateral deviation of the preceding vehicle.

Moreover, in a preferred aspect of the steering assist device, the third parameter is obtained by increasing the weight of the second control parameter as a centrifugal acceleration increases.

Moreover, in a preferred aspect of the steering assist device, the third parameter is obtained by increasing the weight of the second control parameter as a vehicle speed increases.

Further, in a preferred aspect of the steering assist device, the first control parameter is a curvature component, a yaw angle component, and a lateral position component, and a second control parameter is a yaw angle component.

The present invention is not limited to the embodiments described above, and encompasses various modification examples. For example, the embodiments have described the present invention in detail for the ease of understanding, and the present invention is not necessarily limited to a mode that includes all of the configuration described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The present application claims a priority based on Japanese Patent Application No. 2018-131045 filed on Jul. 10, 2018. All disclosed contents including Specification, Scope of Claims, Drawings, and Abstract of Japanese Patent Application No. 2018-131045 filed on Jul. 10, 2018 are incorporated herein by reference in their entirety.

REFERENCE SIGNS LIST

1 . . . vehicle (own vehicle), 10 . . . vehicle control system, 20 . . . driving assist control device (vehicle control device), 30 . . . travel control device, 40 . . . steering control device, 50 . . . external world recognition device (external world recognition unit), 60 . . . vehicle speed sensor, 70 . . . yaw rate sensor, 80 . . . steering angle sensor, 90 . . . electric power steering device (steering actuator)

The invention claimed is:

1. A vehicle control device, the vehicle control device being configured to: input information on a road curvature of a road on which a preceding vehicle traveling forward of a vehicle have traveled, the information being obtained by an external world recognition unit;
input information on a relative position between the vehicle and the preceding vehicle, the information being obtained by the external world recognition unit;
obtain a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and
output an instruction relating to steering of the vehicle for achieving the obtained first-order follow-up control and the obtained second-order follow-up control, to a steering actuator unit relating to the steering of the vehicle,
wherein the vehicle control device is configured to selectively switch between the first-order follow-up control and the second-order follow-up control based on the input information on the road curvature and the input information on the relative position between the vehicle and the preceding vehicle,
wherein the vehicle control device is configured to select the first-order follow-up control when a centripetal acceleration is equal to or higher than a threshold value, or wherein the vehicle control device is configured to select the first-order follow-up control when a vehicle speed is equal to or higher than a threshold value.

2. A vehicle control device, the vehicle control device being configured to:
input information on a road curvature of a road on which a preceding vehicle traveling forward of a vehicle have traveled, the information being obtained by an external world recognition unit;
input information on a relative position between the vehicle and the preceding vehicle, the information being obtained by the external world recognition unit;
obtain a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and
output an instruction relating to steering of the vehicle for achieving the obtained first-order follow-up control and the obtained second-order follow-up control, to a steering actuator unit relating to the steering of the vehicle,
wherein the vehicle control device is configured to weight the first-order follow-up control and the second-order follow-up control based on the input information on the road curvature and the input information on the relative position between the vehicle and the preceding vehicle, to thereby obtain the distribution between the first-order follow-up control and the second-order follow-up control, wherein the vehicle control device is configured to increase the weight of the first-order follow-up control as a centripetal acceleration increases, or wherein the vehicle control device is configured to increase the weight of the first-order follow-up control as a vehicle speed increases.

3. The vehicle control device according to claim 1, wherein the vehicle control device is configured to set a weight of the second-order follow-up control so as to be larger than a weight of the first-order follow-up control in accordance with an increase in a road curvature.

4. The vehicle control device according to claim 1, wherein the vehicle control device is configured to set a weight of the first-order follow-up control so as to be larger than a weight of the second-order follow-up control in accordance with an increase, from a predetermined intermediate value, in an inter-vehicle distance between the vehicle and the preceding vehicle, and to set the weight of the first-order follow-up control so as larger than the weight of the second-order follow-up control in accordance with a decrease in the inter-vehicle distance from the predetermined intermediate value.

5. The vehicle control device according to claim 1, wherein the vehicle control device is configured to set a weight of the second-order follow-up control so as to be larger than a weight of the first-order follow-up control in accordance with an increase in a lateral deviation of the preceding vehicle.

6. A vehicle control method, comprising:
inputting information on a road curvature of a road on which a preceding vehicle traveling forward of a vehicle have traveled, the information being obtained by an external world recognition unit;
inputting information on a relative position between the vehicle and the preceding vehicle, the information being obtained by the external world recognition unit;
obtaining a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and
outputting an instruction relating to steering of the vehicle for achieving the obtained first-order follow-up control and the obtained second-order follow-up control to a steering actuator unit relating to the steering of the vehicle, wherein the vehicle control device is configured to selectively switch between the first-order follow-up control and the second-order follow-up control based on the input information on the road curvature and the input information on the relative position between the vehicle and the preceding vehicle, wherein the vehicle control device is configured to select the first-order follow-up control when a centripetal acceleration is equal to or higher than a threshold value, or wherein the vehicle control device is configured to select the first-order follow-up control when a vehicle speed is equal to or higher than a threshold value.

7. A vehicle control system, comprising:

an external world recognition unit configured to obtain information on a road curvature of a road on which a preceding vehicle traveling forward of a vehicle has traveled;

a controller configured to: input information on the road curvature, the information being obtained by the external world recognition unit;

input information on a relative position between the vehicle and the preceding vehicle, the information being obtained by the external world recognition unit;

obtain a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and output an instruction relating to steering of the vehicle for achieving the obtained first-order follow-up control and the obtained second-order follow-up control; and a steering actuator unit relating to the steering of the vehicle, the steering actuator unit being configured to input the instruction output from the controller, wherein the vehicle control device is configured to selectively switch between the first-order follow-up control and the second-order follow-up control based on the input information on the road curvature and the input information on the relative position between the vehicle and the preceding vehicle, wherein the vehicle control device is configured to select the first-order follow-up control when a centripetal acceleration is equal to or higher than a threshold value, or wherein the vehicle control device is configured to select the first-order follow-up control when a vehicle speed is equal to or higher than a threshold value.

8. A vehicle control method, comprising:

inputting information on a road curvature of a road on which a preceding vehicle traveling forward of a vehicle have traveled, the information being obtained by an external world recognition unit;

inputting information on a relative position between the vehicle and the preceding vehicle, the information being obtained by the external world recognition unit;

obtaining a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and outputting an instruction relating to steering of the vehicle for achieving the obtained first-order follow-up control and the obtained second-order follow-up control to a steering actuator unit relating to the steering of the vehicle, wherein the vehicle control device is configured to weight the first-order follow-up control and the second-order follow-up control based on the input information on the road curvature and the input information on the relative position between the vehicle and the preceding vehicle, to thereby obtain the distribution between the first-order follow-up control and the second-order follow-up control, wherein the vehicle control device is configured to increase the weight of the first-order follow-up control as a centripetal acceleration increases, or wherein the vehicle control device is configured to increase the weight of the first-order follow-up control as a vehicle speed increases.

9. A vehicle control system, comprising:

an external world recognition unit configured to obtain information on a road curvature of a road on which a preceding vehicle traveling forward of a vehicle has traveled; a controller configured to: input information on the road curvature, the information being obtained by the external world recognition unit;

input information on a relative position between the vehicle and the preceding vehicle, the information being obtained by the external world recognition unit;

obtain a distribution between first-order follow-up control and second-order follow-up control based on the input information on the road curvature and the input information on the relative position between the vehicle and the preceding vehicle, the first-order follow-up control causing the vehicle to follow the preceding vehicle through use of a first-order trajectory, the second-order follow-up control causing the vehicle to follow the preceding vehicle through use of a second-order trajectory; and output an instruction relating to steering of the vehicle for achieving the obtained first-order follow-up control and the obtained second-order follow-up control; and a steering actuator unit relating to the steering of the vehicle, the steering actuator unit being configured to input the instruction output from the controller, wherein the vehicle control device is configured to weight the first-order follow-up control and the second-order follow-up control based on the input information on the road curvature and the input information on the relative position between the vehicle and the preceding vehicle, to thereby obtain the distribution between the first-order follow-up control and the second-order follow-up control, wherein the vehicle control device is configured to increase the weight of the first-order follow-up control as a centripetal acceleration increases, or wherein the vehicle control device is configured to increase the weight of the first-order follow-up control as a vehicle speed increases.

\* \* \* \* \*